(No Model.)
A. D. GOODELL.
TOOL HOLDING CHUCK FOR BIT STOCKS.
No. 563,372. Patented July 7, 1896.
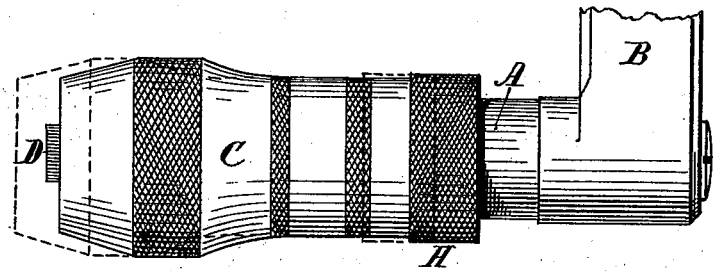
Fig. 1
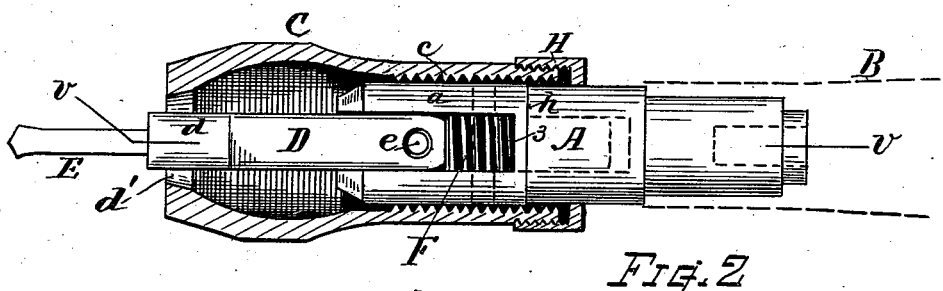
Fig. 2
Fig. 3
Fig. 5  Fig. 4  Fig. 6
Fig. 7
Witnesses
Charles A. Bacon
Simeon E. King
Inventor
Albert D. Goodell
By Chas. H. Burleigh
Attorney

UNITED STATES PATENT OFFICE.

ALBERT D. GOODELL, OF SHELBURNE FALLS, MASSACHUSETTS.

TOOL-HOLDING CHUCK FOR BIT-STOCKS.

SPECIFICATION forming part of Letters Patent No. 563,372, dated July 7, 1896.

Application filed March 5, 1896. Serial No. 581,936. (No model.)

*To all whom it may concern:*

Be it known that I, ALBERT D. GOODELL, a citizen of the United States, residing at Shelburne Falls, in the county of Franklin and State of Massachusetts, have invented a new and useful Tool-Holding Chuck for Bit-Stocks and Tool-Handles, of which the following, together with the accompanying drawings, is a specification sufficiently full, clear, and exact to enable persons skilled in the art to which this invention appertains to make and use the same.

This invention relates to improvements in a bit-holding chuck for bit-braces and tool-handles, of that class in which the shell or operating-cylinder can be unlocked, by disengagement of its threads, for quickly releasing the jaws, the locking and unlocking being controlled by pressure of the shell against the jaws; and it consists in constructing and combining the thread-locking segments, body, and cylinder in the peculiar manner set forth; the object being to render the chuck more perfect and practically efficient in its operation and to limit the action of the thread-locking devices, as hereinafter explained.

In the drawings, Figure 1 is a side view of a bit-stock chuck embodying my invention. Fig. 2 is a side view of the same with the cylinder or shell in longitudinal section. Fig. 3 is a longitudinal section at line $v\,v$ on Fig. 2. Fig. 4 is a partial section showing the thread-locking segments in retracted position. Fig. 5 is a transverse section at line $w\,w$ with the jaws removed. Fig. 6 is a transverse section at line $x\,x$ with segments retracted, and Fig. 7 is a separate view of the outer side of one of the thread-segments and its spring.

Referring to parts, A denotes the body part or socket, which is attached by its shank or rear end to the cranked brace or other suitable handle B, either rigidly or by any of the well-known ratchet appliances commonly employed in bit-stock construction.

C indicates the handpiece, operating-cylinder, or shell, made externally of usual form and internally threaded, as at $c$, with an uninterrupted or continuous helical screw-thread near its rear end and the internal conoidal surface at its fore end.

D D indicate the bit-holding jaws having the usual outwardly-inclined surfaces $d$ near their front ends, upon which the internal conoidal surface $d'$ of the shell acts, for forcing the jaws together for retaining the bit or tool E firmly therein, or for releasing the same, accordingly as the shell is moved on or off of the inclinations $d$. The inner ends of the jaws are loosely linked together by the pin $e$ in well-known manner.

The body A is formed with a non-threaded cylindrical exterior $a$, of a diameter that will fit easily the internal diameter of the shell C, less the dimension of the threads $c$, so that the body forms a bearing upon which the shell can rotate and also move longitudinally, there being no direct threaded engagement of the body with the shell. At its outer end the body is slotted transversely, forming a socket for the jaws D, and a cavity or axial bore of somewhat greater caliber than the width of the slot extends inward beyond the inner end of said slot, as at $f$.

F F indicate movable segments or interlocking parts disposed at opposite sides of the socket within the slot or recess at a position beneath the jaws D, and having screw-threads formed on their outer faces to match the thread on the interior of the shell. Said segments are adapted to move freely in and out radially, but are confined against longitudinal displacement by their shoulders 3 and 5, that respectively abut against the base of the socket, and against a retaining-pin I, that is inserted across the socket between the two segments, as shown. These threaded segments are formed in the peculiar manner shown, with long stems or shanks that extend within the bore or cavity $f$. The outer surfaces of said stems are rounded to match the inner surface of the cavity, and when the segments are at their outward position the portion of the stem below the threaded head takes bearing or stops solidly against the side of the cavity, and thus prevents the screw-threads from being pressed too far against the interior of the shell and causing excessive friction. The inner ends of the segment-shanks are fitted to afford a bearing or fulcrum-point at their inner ends 2, which are thus made to approximately fit the inner diameter of the bore. Circular recesses are formed in the outer faces of the stems and suitable coiled-wire springs J are arranged therein, normally pressing the engaging ends of the segments inward toward the central axis. The outer end faces of the segments are inwardly beveled, as at $m$, to afford a V-shaped seat for the adjacent inner ends of the jaws D, which latter are beveled in opposite direction to effect, as heretofore employed, a wedging action against the opposite segments. (See Fig. 3.)

When the segments F are pressed laterally outward their screw-threaded faces protrude beyond the cylindrical surface $a$ of the body and engage with the threads $c$ of the shell; but when said segments are allowed to fall inward their threaded faces are retracted within the circle of the socket, (see Fig. 4,) and the shell is then free to be moved longitudinally upon the part A to the full limits of its endwise action.

A ring-cap or collar H is secured to the inner end of the shell C, and a small shoulder or annular offset $h$ is provided upon the socket A, with which such collar engages, for limiting the outward movement of the shell and retaining said shell in connection with the socket.

In the operation when the cylinder or shell is at forward position (see dotted lines, Fig. 1) the jaws are free, and the springs J retract the segments F from engagement with the threads $c$ and the shell can slip longitudinally on the socket. When the bit or tool E is inserted and the shell drawn back against the jaws, causing their ends to act against the inclined seats $m$ for throwing outward the threaded segments F to engage the threads of the shell, the outward movement of said segments is arrested by their stems coming in contact with the interior surface of the body, thereby preventing the threaded faces being forced against the interior of the shell with the pressure that would create excessive friction and interfere with the convenient turning of the shell when screwed tightly down for firmly clamping the jaws upon the bit. Release of the bit is effected by a reverse operation, the shell being easily rotated until its screw action relieves the inward pressure of the jaws against the inclines $m$, when the segments F immediately give way and let the shell slide endwise.

I am aware that in a prior patent there is described a bit-brace chuck having pivoted retractile threaded sections that are forced outward to engage with a threaded sleeve by beveled surface and pressure of the jaws, and I do not therefore broadly claim such feature.

What I claim, and desire to secure by Letters Patent, is—

In a chuck for bit-stocks and tool-handles, the combination with the non-threaded slotted and internally-chambered body, the beveled jaws supported therein, and the internally-threaded shell fitting over said body for compressing the jaws; of the retractible thread-engaging segments formed as described, with inwardly-inclined jaw-seating surfaces at their top ends, and having long shanks or stems arranged within the bore of the body and confining the segments to a fixed limit of outward movement, and the inwardly-pressing coiled springs disposed in recesses at the outer side of said stems, and the retaining-pin transversely disposed between the segments and engaging shoulders thereon, for the purpose set forth.

Witness my hand this 28th day of February, 1896.

ALBERT D. GOODELL.

Witnesses:
LUCIAN H. SWEETSER,
A. K. HAWKS.